(12) United States Patent
Mitsuo (10) Patent No.: US 7,113,583 B2
(45) Date of Patent: Sep. 26, 2006

(54) TELEPHONE AND PRIVATE BRANCH EXCHANGE

(75) Inventor: Sadaka Mitsuo, Kasuga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 294 days.

(21) Appl. No.: 10/308,178

(22) Filed: Dec. 3, 2002

(65) Prior Publication Data

US 2003/0118171 A1 Jun. 26, 2003

(30) Foreign Application Priority Data

Dec. 3, 2001 (JP) ............................. 2001-368296

(51) Int. Cl.
*H04M 7/00* (2006.01)
*H04M 11/04* (2006.01)

(52) U.S. Cl. ......................................... 379/229; 379/45

(58) Field of Classification Search ........... 379/355.06, 379/356.01, 229, 45
See application file for complete search history.

(56) References Cited

U.S. PATENT DOCUMENTS

| | | | |
|---|---|---|---|
| 4,571,462 A | 2/1986 | Janssen | |
| 5,054,058 A | 10/1991 | Kakizawa | |
| 6,243,442 B1 * | 6/2001 | Tanaka et al. | 379/45 |
| 6,243,459 B1 * | 6/2001 | Cannon et al. | 379/356.01 |
| 6,298,131 B1 * | 10/2001 | Veschi | 379/355.06 |
| 6,731,721 B1 * | 5/2004 | Aoki et al. | 379/45 |

FOREIGN PATENT DOCUMENTS

| | | |
|---|---|---|
| EP | 0276992 A2 | 8/1988 |
| EP | 0454421 A2 | 10/1991 |
| JP | 57-132464 | 8/1982 |
| JP | 63-090651 | 6/1988 |
| JP | 63-190464 | 8/1988 |
| JP | 01-151349 | 6/1989 |
| JP | 4-336738 | 11/1992 |
| JP | 05-091196 | 4/1993 |
| JP | 2000-049944 | 2/2000 |

* cited by examiner

*Primary Examiner*—Wing Chan
*Assistant Examiner*—Thjuan P. Knowlin
(74) *Attorney, Agent, or Firm*—McDermott Will & Emery LLP (57) ABSTRACT

A telephone of the present invention is a push button type telephone whereby a DTMF signal of a first one-touch dial table is sent out in accordance with operation keys input in the general line mode and a DTMF signal of a second one-touch dial table is sent out in the private branch exchange mode. A signal sent out from a telephone in the private branch exchange mode represents a character string composed of one or more of character, starting with a character selected from a particular character group like such a less frequently used character as "A", "B", "C" or "D", for example. A function table on the part of a private branch exchange establishes ties between a character string starting with a character included in the aforementioned character group and a service function.

24 Claims, 5 Drawing Sheets

GENERAL LINE MODE

FIG. 5B

PRIVATE BRANCH EXCHANGE MODE

TELEPHONE AND PRIVATE BRANCH EXCHANGE

FIELD OF THE INVENTION

The present invention relates to a telephone which is available with single button dialing and a private branch exchange to provide a variety of service functions according to the signals transmitted from the telephone.

BACKGROUND OF THE INVENTION

A push button dialing type general telephone has a DTMF signal generating means. A DTMF signal is formed by combining two frequencies, each of which is selected from a high frequency group of 1209 Hz, 1336 Hz, 1477 Hz and 1633 Hz and a low frequency group of 679 Hz, 770 Hz, 852 Hz and 941 Hz, respectively. Accordingly, a combination of 4 by 4 equaling to 16 different DTMF signals is possible for the signal generation. In general, these 16 different DTMF signals are allotted to respective numerals of "0" through "9" and codes of "*", "#", "A", "B", "C" and "D". The user is allowed to receive such services as telephone exchange connections and the like by sending dial signals via a general telephone to a telephone exchange of the public telephone network or an analog type private branch exchange by means of the DTMF signals.

Further, a general telephone is provided with function keys such as a operation keys, a redial key and the like in addition to dial keys for outputting the DTMF signals, thereby allowing such telephone functions as one-touch dialing, abbreviated dialing, redialing and the like to be performed.

Recently, many private branch exchanges have been employing a digital system and the ones with more advanced functions have been prevailing. However, since the aforementioned general telephone is designed for connecting with general lines (such as an analog station line, a digital station line and the like), the general telephone as such some times does not work properly or can not utilize well the service functions of a private branch exchange.

In addition, a private branch exchange is designed on the understanding that numerous service functions are realized by having a dedicated telephone of the private branch exchange connected, thereby allowing many of the private branch exchanges to be satisfied with performing a minimum of functions when a general telephone is connected therewith even if the connection is possible.

Therefore, when a general telephone is connected to a private branch exchange as one of the extension stations together with dedicated telephones, the user of the general telephone is restricted in utilizing the numerous service functions that are made available to the user of a dedicated telephone, thereby preventing the user from enjoying the valuable and diversified service functions of the private branch exchange or forcing the user to go through complex steps of maneuver even if the general telephone can be connected. Even when operational instructions are exchanged between a general telephone and a private branch exchange by using the foregoing DTMF signal system, despite the framework of 16 different signals that are possible theoretically, it is usual that the numerals of "0" through "9", and codes of "*" and "#" only are used and the codes of "A", "B", "C" and "D" remain unused.

Furthermore, many of the push-button type general telephones have no buttons for sending out the codes of "A", "B", "C" and "D". One of the reasons for this is considered to be lack of a sufficiently improved infrastructure (including private branch exchanges), whereby services are provided through the use of DTMF signals of "A", "B", "C" and "D".

Accordingly, the combined use of prior art push-button type general telephones and a private branch exchange has not allowed the functions of the private branch exchange to be exploited to the fullest extent. As a result, when an enterprise employing no private branch exchange as yet decides on an introduction of a private branch exchange, for instance, it is absolutely needed that dedicated telephones are procured at the same time to exploit the functions of the private branch exchange sufficiently. And, the same can be said when an enterprise having already installed a private branch exchange decides on replacing the private branch exchange. In such cases, the old type telephones that have been long used are often discarded.

On the other hand, with respect to a general telephone itself, the DTMF signals therefrom are generated generally by an LSI provided with a DTMF signal generating function and many of the general telephones are missing the buttons to send out the codes of "A", "B", "C" and "D" in spite of the fact that the LSI is capable of sending out the numerals of "0" through "9" plus codes of "*", "#", "A", "B", "C" and "D", thus having the inherent functional capabilities left unused.

SUMMARY OF THE INVENTION

The present invention discloses a telephone comprising:
a line interfacing unit to connect with communication lines;
a DTMF signal generator to generate DTMF signals;
a key inputting unit having operation keys for sending DTMF signals to communication lines or a private branch exchange;
a first one-touch dial table to store dial numbers;
a second one-touch dial table to allow dial numbers to be stored;
and
a switching unit to select one of a first mode using the first one-touch dial table and a second mode using a second one-touch dial table.

DESCRIPTION OF THE PREFERRED EMBODIMENT

Next, a description is given to an exemplary embodiment of the present invention with reference to drawings.

(Exemplary Embodiment 1)

Figure 1A:
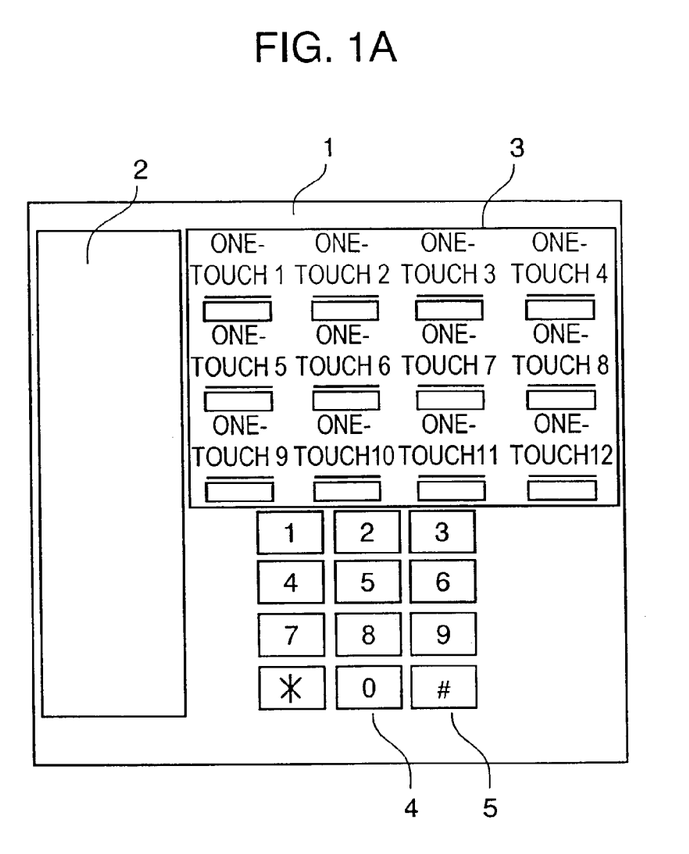
FIG. 1A is a front view of a general telephone in exemplary embodiment 1 of the present invention.
Figure 1B:
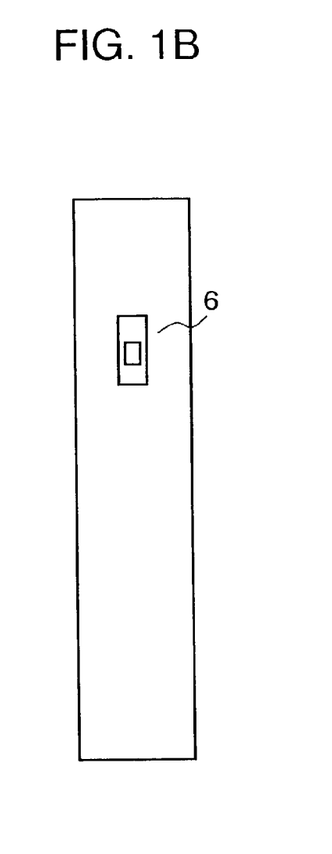
FIG. 1B is a side view of the general telephone of FIG. 1A.

FIG. 1A is a front view of a general telephone in exemplary embodiment 1 of the present invention and FIG. 1B is a side view of the general telephone of FIG. 1A.

In FIG. 1A, main body 1 of a push-button type telephone having a one-touch dialing function comprises handset 2 and operation keys 3 is configured to send out DTMF signals based on the one-touch dial table stored in storing unit 9 as described later when operation keys 3 are pressed down. Operation keys 3 incorporate 12 keys and can be used as operation keys for general lines in the general line mode and as operation keys for private branch exchange in the private branch exchange mode. Here, the general line mode means a mode of mainly sending out telephone numbers of connected contacts and the private branch exchange mode means a mode of connecting the telephone to a private branch exchange.

For example, when "one-touch 1" through "one-touch 12" are pushed in the general line mode, the resulting output signal can be freely registered/altered by the user and these keys can be used as operation keys, thereby allowing a registration to be made freely by the user.

When operation keys 3 are pushed in the private branch exchange mode, a signal determined in advance for a private branch exchange is outputted. (In this case, the user can not register/alter the signal.) In other words, operation keys 3 functions as function keys "F1" through "F12" to send a command signal to a private branch exchange.

In the private branch exchange mode, it is also possible for only part of 12 operation keys to use as function keys for a private branch exchange. For instance, only 6 keys out of the 12 keys are allowed to be used as function keys ("F1" to "F6") for a private branch exchange. In this case, the other keys can be used as "one-touch 7" through "one-touch 12" in the same way as in the general line mode with a resulting output of signals that are registered by the user when these keys are pushed.

Operation keys 3 are defined as devices to transmit a signal upon activation and include a device activated by a touch sensor, a navigation key and the like.

In FIG. 1A, dial key 4 for regular use comprises 10 numeric keys of "0" through "9" and code keys of "*" and "#". Alphabet key 5 comprises character keys of "A", "B", "C" and "D". When any one of these dial key 4 for regular use and alphabet key 5 is pushed, a DTMF signal corresponding to the key is sent out.

As FIG. 1B shows, a telephone of exemplary embodiment 1 has switch 6 for selecting one of modes to switch between the general line mode and the private branch exchange mode, which is provided on the side surface of the telephone. Switch 6 for selecting one of modes is a mechanical switch, thereby allowing the setting to a private branch exchange mode to be performed quite easily.

Although the switch for selecting one of modes of exemplary embodiment 1 is designed to perform the switching between modes mechanically, the switch can be replaced with a software switch utilizing software as described later. More specifically, the adoption of a software switch, which makes it possible to switch between modes at the key inputting unit, can prevent erroneous switching between modes performed by the user.

Figure 2:
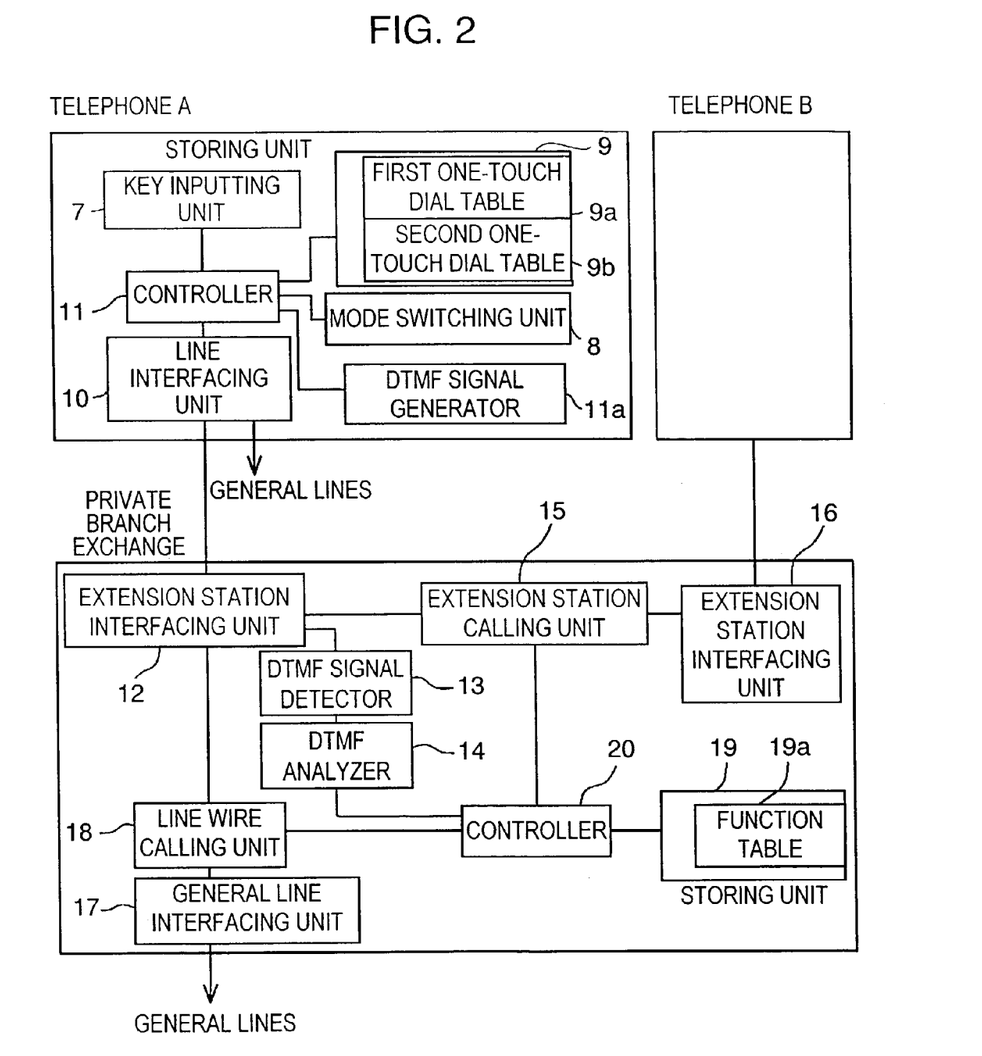
FIG. 2 is a block diagram of a general telephone and a private branch exchange in exemplary embodiment 1 of the present invention.

FIG. 2 is a block diagram of a telephone and a private branch exchange in exemplary embodiment 1 of the present invention. A description is given to the telephone of exemplary embodiment 1 based on the block diagram as FIG. 2 shows. In FIG. 2, key inputting unit 7 is an inputting unit comprising aforementioned operation keys 3 and dial key 4 for regular use and the like. Mode switching unit 8 switches the operation mode of the telephone to the general line mode or to the private branch exchange mode by activating aforementioned switch 6 for selecting one of modes. This mode switching unit 8 is allowed to be any one selected from something like a mechanical switch and a thing to perform a switching function according to the software setting made at the key inputting unit and the like.

Storing unit 9 stores text data such as a combination and the like of DTMF signal frequencies corresponding to the numerals of "0" through "9" and codes of "*", "#", "A", "B", "C" and "D" that are sent out when dial key 4 for regular use is pushed, and also programs that are necessary for controlling.

Storing unit 9 also stores first one-touch dial table 9a for performing the one-touch dial function used in the general line mode and also second one-touch dial table 9b for achieving the exchange's service function used in the private branch exchange mode.

Line interfacing unit 10 is connected to a general line or a private branch exchange to perform communications controlling. Controller 11 controls all the telephones as a whole. DTMF signal generator 11a sends out DTMF signals according to given key information. More specifically, DTMF signals corresponding, respectively, to the numerals of "0" through "9" and codes of "*", "#", "A", "B", "C" and "D" are sent out.

Controller 11 has DTMF signals generated in DTMF signal generator 11a based on key input signals from key inputting unit 7. More specifically, when dial key 4 for regular use is used, a DTMF signal corresponding to the key pushed is generated in DTMF signal generator 11a and, when operation keys 3 are pushed, a DTMF signal corresponding to the pushed operation keys 3 are generated in DTMF signal generator 11a with reference to first one-touch dial table 9a or second one-touch dial table 9b, both of which are stored in storing unit 9. The generated DTMF signals are sent to a general line or a private branch exchange via line interfacing unit 10.

Also, controller 11 has the operation mode of a telephone switched by mode switching unit 8 in accordance with the information inputted and processes the input from key inputting unit 7 in association with first one-touch dial table 9a in the general line mode and second one-touch dial table 9b in the private branch exchange mode.

In a private branch exchange of exemplary embodiment 1, extension station interfacing unit 12 and extension station interfacing unit 16 perform communications controlling between the telephones connected and the private branch exchange. DTMF signal detector 13 detects a DTMF signal from the signals sent from the connected telephones via extension station interfacing unit 12. DTMF analyzer 14 performs an analysis of the detected DTMF signal.

Extension station calling unit 15 establishes a voice communications channel between the telephones connected to an internal line. For example, a voice communications channel is established between telephone A of exemplary embodiment 1 and different extension station telephone B as FIG. 2 shows.

General line interfacing unit 17 is connected to general lines and performs communications controlling. Line wire calling unit 18 establishes a voice communications channel between a private branch exchange and general lines. Storing unit 19 stores the control program and data of a private branch exchange. According to function table 19a in storing unit 19, needed operation is set up in advance by the user based on the DTMF signals sent from a telephone. Controller 20 controls a private branch exchange as a whole.

Figure 3:
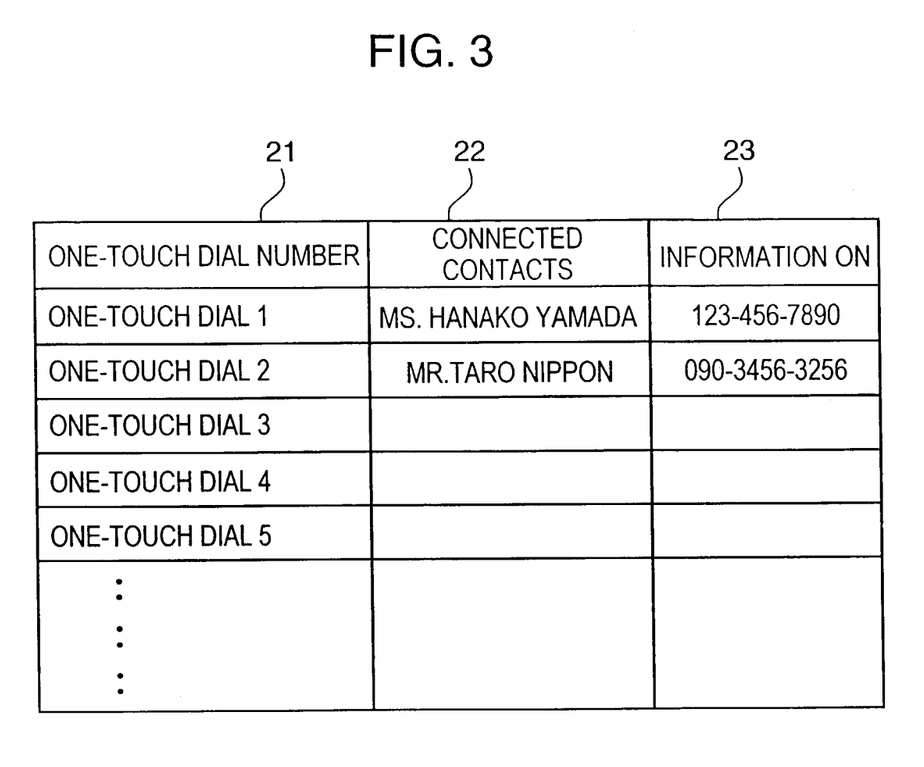
FIG. 3 is a first one-touch dial table for use in the general line mode of a general telephone in exemplary embodiment 1 of the present invention.

FIG. 3 shows the typical setting of first one-touch dial table 9a in the general line mode of a telephone of exemplary embodiment 1 and FIG. 6A is a layout diagram of operation keys in the general line mode of the telephone. Next, a description is given to first one-touch dial table 9a provided to a telephone of exemplary embodiment 1 with reference to FIG. 2, FIG. 3 and FIG. 5A.

Figure 5A:
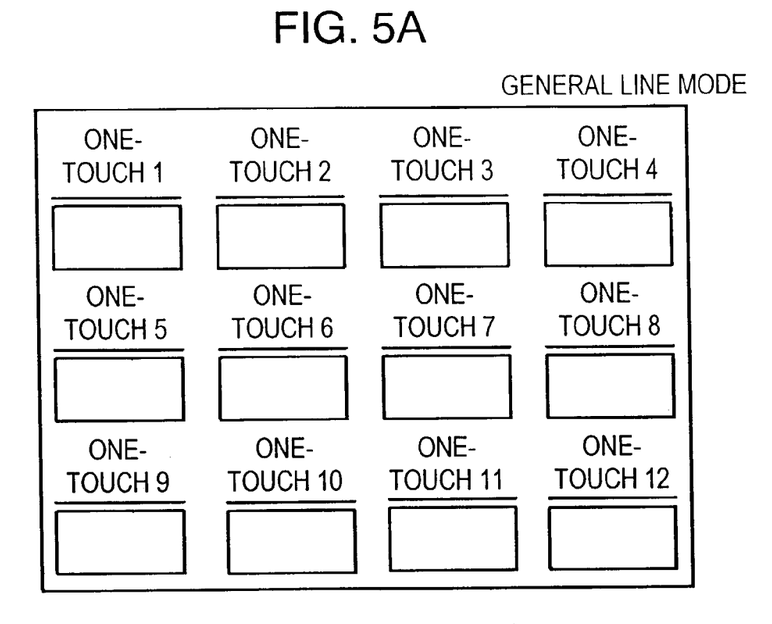
FIG. 5A is a layout diagram of operation keys for use in the general line mode of a general telephone in exemplary embodiment 1 of the present invention.

In FIG. 3, reference numeral 21 indicates one-touch dial numbers, by which one-touch dials are registered, and reference numeral 22 shows contacts to be connected for establishing a voice communications channel. Reference numeral 23 indicates the information on transmitted numbers associated with respective one-touch dial numbers, i.e., telephone numbers of the parties on the other end of the line. When the telephone in question is equipped with a character inputting capability, connected contacts column 22 can also be filled out. If not, this column is not to be provided, thereby ending up with having the information on transmitted numbers tied only with one-touch dial numbers column 21. In this case, connected contacts 22 can be identified by putting indicator labels, each carrying pertinent information, under one-touch dial numbers 21 of telephone's operation keys 3. At this time, how the layout of one-touch dial numbers of operation keys 3 appears is as illustrated in FIG. 5A. By having indicator labels put in place, the user is allowed to enjoy improved ease-of-use of the telephone.

When the general line mode is selected by means of switch 6 for selecting one of modes of FIG. 1B, controller 11 establishes close ties between first one-touch dial table 9a and operation keys 3. At this time, upon pushing operation keys 3 associated with one-touch dial numbers 21 that are registered in first one-touch dial table 9a, controller 11 reads out data on connected contacts 22 and information 23 on transmitted number in question from first one-touch dial table 9a and displays connected contacts 22 on a displaying unit when this is installed. Meanwhile, DTMF signal generator 11a is made to generate DTMF signals based on read out information 23 on transmitted number and DTMF signals thus generated are sent out to general lines, thereby establishing connections with general lines.

It is necessary for first one-touch dial table 9a to be prepared and registered in advance by the user with the help of dial key 4 for regular use and the like.

Figure 4A:
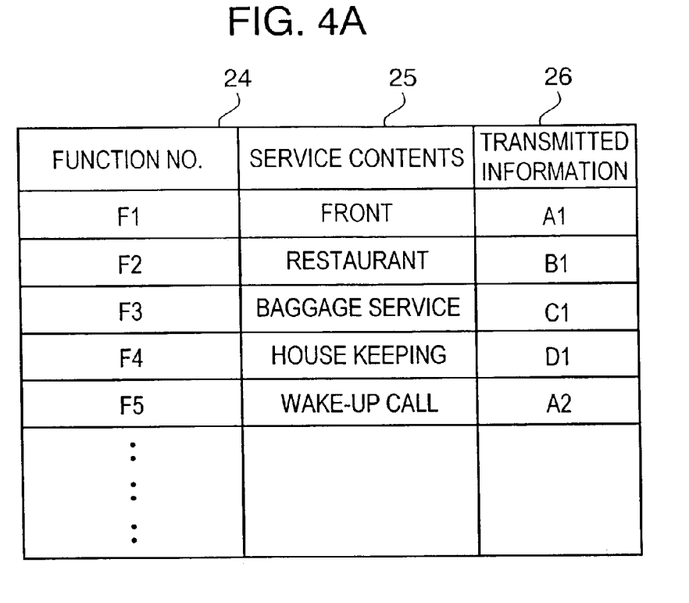
FIG. 4A is a second one-touch dial table for use in the private branch exchange mode of a general telephone in exemplary embodiment 1 of the present invention.
Figure 4B:
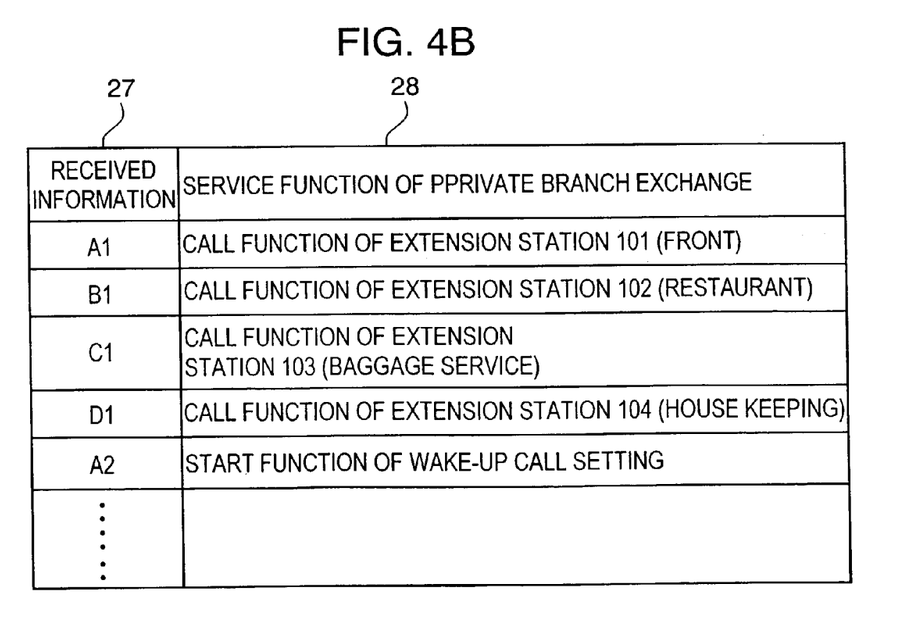
FIG. 4B is a function table of a private branch exchange in exemplary embodiment 1 of the present invention.

Next, a description is given to second one-touch dial table 9b provided to a telephone of exemplary embodiment 1 and function table 19a provided to a private branch exchange of exemplary embodiment 1 with reference to FIG. 2, FIG. 3, FIG. 4A and FIG. 4B. FIG. 4A is a typical layout of second one-touch dial table 9b in the private branch exchange mode of the telephone. FIG. 4B is a typical layout of function table 19a of a private branch exchange of the present invention.

In FIG. 4A, reference numeral 24 shows function numbers provided in second one-touch dial table 9b and made to correspond to respective operation keys of operation keys 3. Reference numeral 25 is a service content indicating the functions related to respective function numbers. Reference numeral 26 shows the information on transmitted numbers stored and corresponding to respective function numbers 24. Thus, character strings predetermined fixedly during the production and the like of a telephone are registered in second one-touch dial table 9b, thereby prohibiting the user from applying any alterations and the like thereto by the use of dial key 4 for regular use and the like beforehand.

Function table 19a is stored in storing unit 19 of a private branch exchange and checked upon receiving a predetermined DTMF signal from a telephone and the execution of respective applicable functions follows.

As information 26 on transmitted numbers, which is used in the private branch exchange mode between a telephone and a private branch exchange, are used a character string composed of one or more of character, starting with one character selected from a particular character group. More specifically, a character group is determined in advance, the character group being composed of a plurality of characters selected from all the characters that can be generated in DTMF signal generator 11a. And, it is determined that a character selected from the foregoing character group or a character string starting with a character selected from the character group is used as the signal transmitted between a telephone and a private branch exchange. Function table 19a of a private branch exchange establishes ties between the character or character string thus determined and the service function.

There are included four characters of "A", "B", "C" and "D" of a DTMF signal, for example, in the character group and a service function is identified by only one character ("A" only, for example) or a plurality of character strings, each starting with such a character as "A", "B", "C" or "D". By the plurality of character strings, each starting with such a character as "A", "B", "C" or "D", are meant such character strings as "A % % . . . %" and the like, in which "%" can be replaced with numerals of "1", "2", . . . , or codes of "*", "#", "A", "B", "C" and "D". Accordingly, in exemplary embodiment 1, a service function is identified by such information as one character only ("A", for example) or a character string starting with a character selected from "A", "B", "C" and "D". In the private branch exchange mode, an input through operation keys 3 allow the information composed of the foregoing character or character string to be sent out as a DTMF signal.

When a telephone of exemplary embodiment 1 is capable of performing character inputting, service content 25 can also be recorded. However, with a telephone furnished with no character inputting capability, data of service content 25 is not allowed to be recorded, thereby ending up with only establishing ties with the DTMF signal acting as a transmission signal. In this case, service content 25 can be identified by pasting an indicator label and the like below function number 24 of operation keys 3 of a telephone as exemplified in FIG. 5B which illustrates a layout of function numbers of operation keys 3. A provision of indicator labels makes it possible for easily understandable operation keys 3 indicating the service functions of a private branch exchange to be prepared readily, thereby allowing a telephone to be made usable as a dedicated telephone at low cost.

When the private branch exchange mode is selected by the use of switch 6 for selecting one of modes of FIG. 1B, second one-touch dial table 9b is brought into the scene by controller 11. When operation keys 3 corresponding to function number 24 registered in second one-touch dial table 9b is pushed, controller 11 reads out applicable service content 25 and information 26 on transmitted number from second one-touch dial table 9b. When a display unit is available, service content 25 is displayed and also a DTMF signal corresponding to information 26 on transmitted number is generated in DTMF signal generator 11a and sent out to a private branch exchange. A variety of functions are realized in accordance with information 26 on transmitted number from a telephone.

Next, a description is given to function table 19a of a private branch exchange. In FIG. 4B, reference numeral 27 indicates received signals and reference numeral 28 indicates service functions of a private branch exchange, ties of which are established with each respective received signal. As mentioned in above, since a specific character group is determined in advance between a telephone and a private branch exchange of the present invention (4 characters of "A", "B", "C" and "D", for example), received information 27 included in function table 19a is composed of one character only ("A" only, for example) or a character string starting with a certain character from a group of characters, thus ties between the character information and the service functions of a private branch exchange being established.

Upon sending a DTMF signal from a telephone, a private branch exchange detects the DTMF signal by means of DTMF signal detector 13 and analyzes what characters compose the detected DTMF signal in DTMF analyzer 14. When the character obtained from the analysis matches with received information 27, the service function corresponding thereto is performed. Function table 19a is allowed to be changed freely together with received information 27 and service function 28 by the user or controller of a private branch exchange. And the method of changing function table 19a can be established according to such means as setting up a private branch exchange connected to a computer and employing a dedicated extension station, a relay station and the like.

Incidentally, there are some telephones, which cannot send out all the 16 different DTMF signals, among the prior art general telephones. For example, because of inability of sending out DTMF signals corresponding to the characters of "A", "B", "C" and "D", the dial numbers of most of the aforementioned telephones corresponding, respectively, to the services provided by a prior art private branch exchange are generally composed of character strings, each starting with a character different from any of the characters of "A", "B", "C" and "D". And, a service content against the same dial number differs most of the time from maker to maker and further from type to type even with the same maker. For example, a private branch exchange has "* 1 2 3" established as the wake-up call service and another private branch exchange has "* 9 9 2" set up as the wake-up call service. Furthermore, even the same type of product has different numbers assigned to different versions of the same type.

Therefore, when a transmitted signal (a DTMF signal) sent to a private branch exchange is stored in a telephone fixedly, the dial plan (the match between the service and the dial number) of the private branch exchange is set up in such a way as making the transmitted signal correspond to the required service. And, when the user of a telephone replaces the telephone, it is necessary for the dial plan of the private branch exchange to be changed so as to have the transmitted signal of a new telephone adapted to the required service, resulting in consuming often a considerable amount of time to change the dial plan. When there is an overlap between the number that the user of a private branch exchange wishes to use and the dial number stored fixedly in a telephone, there is created a situation where the user's requirement is not allowed to be satisfied.

In order to cope with the foregoing situation, the present invention proposes a provision that the characters of "A", "B", "C" and "D" so far seldom-used are employed to form a particular character group to be sent as a transmitted signal outputted from a telephone upon pushing the operation keys in the private branch exchange mode and a DTMF signal of a character string starting with a character within the particular character group (or of one character only) is to be sent out. On the part of a private branch exchange also, according to the aforementioned rule, the services provided by the private branch exchange are further allowed to be allotted against the DTMF signal of the character string starting with one character within the character group ("A", "B", "C" and "D", for example).

As a result, when a new service is additionally performed by a private branch exchange by expanding the function thereof or when a private branch exchange is replaced with a new one with the telephones left unchanged, no concerns emerge with respect to a dial plan of character strings, each starting with a character generally used except for the foregoing character group and it suffices that only a dial number composed of a character string starting with a character included in the foregoing character group and a service number are allotted with respect to a new service. Therefore, it is extremely simple for a private branch exchange to be set up and a new service can be added without any consideration of the changes caused to the dial plan generally used according to product kinds, thus allowing the invention to be applicable readily to whatever private branch exchanges.

Next, a detailed description is given to how a telephone and a private branch exchange of exemplary embodiment 1 operate.

In FIG. 2, when mode switching unit 8 selects the general line mode by the operation of switch 6 for selecting one of modes and a one-touch dial input is fed to controller 11 from key inputting unit 7 upon pushing operation keys 3, controller 11 reads out the content of first one-touch dial table 9a stored in advance in storing unit 9 by the user and then sends out a DTMF signal corresponding to pushed operation keys 3 to the general line. Suppose the number of 123-456-7890 is registered by the user with one-touch dial number 1. When the user pushes the operation keys of one-touch dial number 1, the telephone sends out to the general line one touch dial table 9a of one-touch dial number 1, i.e., "1234567890", registered as information 23 on transmitted number. When a display unit is provided, "Ms. Hanako Yamada" is displayed on the display unit as the connected contact.

Figure 5B:
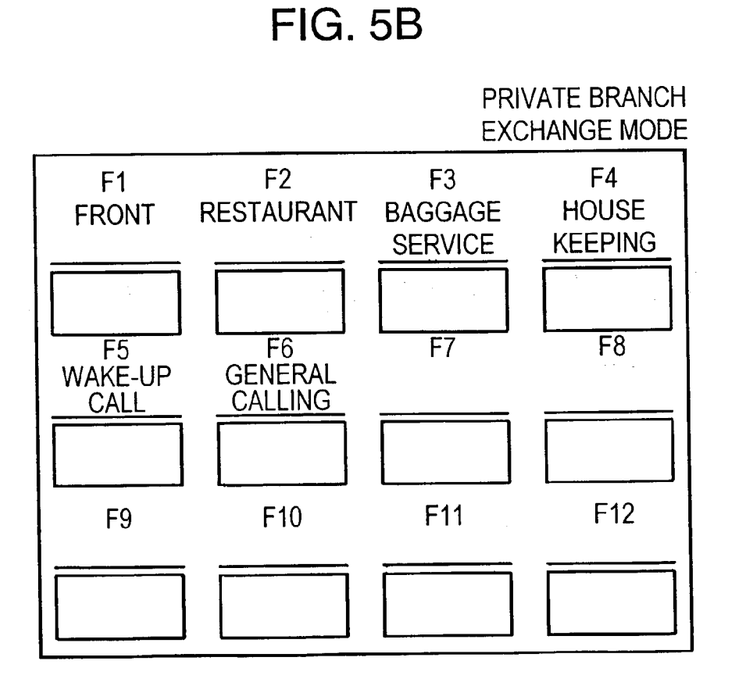
FIG. 5B is a layout diagram of operation keys for use in the private branch exchange mode in exemplary embodiment 1 of the present invention.

When mode switching unit 8 selects the private branch exchange mode by the operation of switch 6 for selecting one of modes and an input is fed to controller 11 from key inputting unit 7 upon pushing operation keys 3, controller 11 reads out the content of second one-touch dial table 9b fixedly stored in advance in storing unit 9 and then sends out a DTMF signal corresponding to pushed operation keys 3. For example, as FIG. 4A, FIG. 4B and FIG. 5B show, "A1" is registered as transmitted information 26, corresponding to function number 24 and, upon pushing a key of F1 in function number 24, the telephone sends out a transmission signal of "A1" registered as transmitted information 26 to the private branch exchange. Similarly, upon pushing keys of F2, F3, F4 and F5 in function number 24, the telephone sends out DTMF signals "B1", "C1", "D1" and "A2", respectively.

The private branch exchange detects DTMF signals, each starting with a character belonging to a particular character group (of "A", "B", "C" and "D"), in DTMF signal detector 13 by using extension station interfacing unit 12. Controller 20 reads out service function 28 of the private branch exchange established beforehand according to a DTMF signal corresponding to a character string composed of one or more of character, starting with an English character like the one in the detected character group (of "A", "B", "C" and "D") from function table 19a. For example, when controller 20 detects a DTMF signal of "A1" („detecting "A" and "1", in succession), reads out "a call function of extension station of the front" corresponding to "A1" from function table 19a and then executes the calling of the front (at extension station 101) via extension station calling unit 15 and extension station interfacing unit 16. Similarly, the private branch exchange having detected DTMF signals "B1", "C1", "D1" and "A2" corresponding to function keys F2, F3, F4 and F5, respectively, executes such functions as calling extension station 102 (restaurant), calling extension station 103 (baggage service), calling extension station 104 (house keeping), calling a start function of wake-up call setting and the like as FIG. 4A and FIG. 4B show service content 25 and service function 28 for the private branch exchange, respectively.

The general telephones as used in a hotel and the like are many times used only for connecting to some places within the facilities and, therefore, service function 28 of the private branch exchange is often configured simply to allow the user to dial the already setup phone number of the contact to be connected. However, the private branch exchange is also allowed to be assigned a variety of other service functions than the ones in above (such as a function to listen to the message stored in a voice mail and the like, a function to refuse the reception of arrived messages, a function to start the setting of a wake-up call and the like).

Accordingly, in exemplary embodiment 1, since a dial number corresponding to a character string composed of one or more of character, starting with "A", "B", "C" or "D", is stored beforehand in the second one-touch dial table, unused DTMF signals can be used effectively and also, by allocating a function corresponding to the dial number of the character string composed of one or more of character, starting with "A", "B", "C" or "D", to the private branch exchange, the operation keys of a telephone is allowed to be used easily like a function key of a dedicated telephone.

On the other hand, since a function corresponding to a DTMF signal denoting a character string starting with "A", "B", "C" or "D" is allotted to a private branch exchange, a dial plan configuration for a general-purpose private branch exchange (featuring an assignment of a function to be performed for each respective character string when a DTMF signal of a character string starting with a character different from any of "A", "B", "C" and "D" is received) is not hindered and separately a function corresponding to a DTMF signal denoting a character string starting with "A", "B", "C" or "D" is allotted to the operation keys of a telephone, thereby allowing the operation keys of the telephone to be used conveniently as the function key of a dedicated telephone.

In addition, the present invention allows a push-button type telephone connectable to a general telephone line to be used as an extension station telephone having a function like a function key of a dedicated telephone even when the push-button type telephone is combined with a private branch exchange. Furthermore, the present invention allows both a telephone that utilizes effectively unused DTMF signals and a private branch exchange to connect with the telephone to be available.

With a telephone of the present invention, since transmission information of operation keys of the private branch exchange mode is arranged to be stored fixedly in advance at the time of production, it suffices that a mode switching unit is activated to switch to the private branch exchange mode. Thereafter, a service function is set up according to the transmission information at the side of the private branch exchange, thereby allowing the various functions to be realized.

Although a transmitted signal is described as a DTMF signal in exemplary embodiment 1, it is also possible to configure that a PULSE signal is selected. Selecting one of a PULSE signal and a DTMF signal can be performed by means of a select switch but, even when switching to the PULSE signal is being performed by the select switch, the DTMF signal is arranged to be sent out under the private branch exchange mode.

What is claimed is:

1. A telephone comprising:
   (a) a first table for storing a first text data;
   (b) a second table for storing a second text data; and
   (c) a switch configured to select one of a first connection mode for connecting said telephone to a private branch exchange and a second connection mode for connecting said telephone to a general line,
   wherein said telephone utilizes said first text data stored in said first table when operating in said first connection mode, and utilizes said second text data stored in said second table when operating is said second connection mode.

2. A telephone according to claim 1, wherein said second text data includes at least one of a character and a numeral.

3. A telephone according to claim 1, wherein said second text data includes at least a part of a first dial number.

4. A telephone according to claim 1, wherein said second text data includes an English character.

5. A telephone according to claim 1, wherein said switch for selecting one of modes is a mechanical switch.

6. A telephone according to claim 1, wherein said switch is a software switch controlled by software.

7. A system including a telephone comprising:
   (a) a first table for storing a first text data;
   (b) a second table for storing a second text data having a character;
   (c) a switch configured to select one of a first connection mode for connecting said telephone to a private branch exchange and a second connection mode for connecting said telephone to a general line,
   wherein said telephone utilizes said first text data stored in said first table when operating in said first connection mode, and utilizes said second text data stored in said second table when operating is said second connection mode;
   (d) a key inputting unit having an operation key;
   (e) a DTMF signal generator for generating a DTMF signal according to an operation of said operation key and for transmitting said DTMF signal; and
   a private branch exchange comprising:
   (f) an extension station interfacing unit for communicating with said telephone;
   (g) a DTMF signal detector for detecting said DTMF signal sent from said extension station interfacing unit;
   (h) a DTMF analyzer for analyzing said DTMF signal detected by said DTMF signal detector;
   (i) a function table for linking said second text data to a service function of said private branch exchange; and
   (j) a controller for controlling said private branch exchange,
   wherein said controller controls said private branch exchange based on said function table.

8. A telephone according to claim 1,
wherein said second table is set up and changed by a user, and
wherein said first table is set up in advance and is not allowed to be changed by the user.

9. A telephone according to claim 1, further comprising:
(d) a line interfacing unit for connecting the telephone to a communication line;
(e) a key inputting unit including an operation key; and
(f) a DTMF signal generator for generating a DTMF signal,
wherein in said second mode of operation, said second text data read out from said second table upon pushing said operation key is sent to said DTMF signal generator, and
wherein in said first mode of operation, said first text data read out from said first table upon pushing said operation key is sent to said DTMF generator, thereby sending said DTMF signal generated in accordance with said first text data to said private branch exchange.

10. A telephone according to claim 7, wherein said second text data includes at least one of a character and a numeral.

11. A telephone according to claim 7,
wherein said second table is set up and changed by a user, and
wherein said first table is set up in advance and is not allowed to be changed by the user.

12. A system including a telephone comprising:
(a) a key inputting unit having an operation key;
(b) a DTMF signal generator for generating a DTMF signal according to an operation of said operation key and for transmitting said DTMF signal;
(c) a first table for storing a first text data;
(d) a second table for storing a second text data having a character;
(e) a switch configured to select one of a first connection mode for connecting said telephone to a private branch exchange and a second connection mode for connecting said telephone to a general line,
wherein said telephone utilizes said first text data stored in said first table when operating in said first connection mode, and utilizes said second text data stored in said second table when operating is said second connection mode;
a private branch exchange comprising:
(f) an extension station interfacing unit for connecting to an extension station;
(g) a DTMF signal detector for detecting said DTMF signal sent from said extension station interfacing unit;
(h) a DTMF analyzer for analyzing said DTMF signal detected by said DTMF signal detector;
(i) a storing unit for storing a function table to link said second text data to a service function of said private branch exchange; and
(j) a controller for executing said service function corresponding to said character, when said DTMF signal analyzed by said DTMF analyzer is determined as said character included in said function table stored in said storing unit.

13. A system including a telephone according to claim 12, wherein such a configuration is set up as making it possible to use a character string comprising one or more characters, starting with a character selected from a particular character group, as a transmitted signal used between said telephone and said private branch exchange in said private branch exchange mode,
wherein ties between said character string comprising one or more characters, starting with a character selected from a particular character group, and said operation keys are established by said first table of said telephone, and
wherein ties between a character string comprising one or more characters, starting with a character selected from said same character group, and a service function are established by said function table of said private branch exchange.

14. The telephone according to claim 12, wherein said first text data comprising one or more characters starting with an English character is stored in advance.

15. The telephone according to claim 12, wherein said English character is one of "A," "B," "C" and "D."

16. The telephone according to claim 12,
wherein text data in the second table are set up and changed by a user, and
wherein said first table is set up in advance, and transmission information is not allowed to be changed by the user.

17. A telephone comprising:
a first table and a second table configured to store first text data and second text data, respectively;
a switch configured to select one of a first connection mode connecting between the telephone and a private branch exchange and a second connection mode which is different from said first connection mode; and
a key associated with one of the first table and the second table in accordance with condition of the switch,
wherein the key specifies outputting a first signal associated with text data in the first table from the telephone if the switch selects the first connection mode, and the key specifies outputting a second signal associated with text data in the second table from the telephone if the switch selects the second connection mode.

18. A telephone according to claim 17, wherein the first connection mode is a private branch exchange mode and the second connection mode is a general line mode.

19. A telephone according to claim 17 further comprising:
a storing unit configured to store both the first table and the second table.

20. A private branch exchange connectable with a telephone according to claim 17 comprising:
an interface configured to communicate with the telephone;
a function table configured to associate each first signal with a service function; and
a controller configured to control the private branch exchange,
wherein if the controller receives a first signal outputted from the telephone through the interface, the controller reads out a service function associated with the received first signal from the functional table, and sends a third signal associated with the functional service to another telephone related with the functional service.

21. A telephone comprising:
a switch configured to select one of a first connection mode for connecting said telephone to a private branch exchange and a second connection mode for connecting said telephone to a general line; and
a key associated with one of a first table and a second table, both of which include text data in accordance with condition of the switch,
wherein the key relates with outputting a first signal associated with text data in the first table if the switch selects the first connection mode, and the key relates with outputting a second signal associated with text data in the second table if the switch selects the second connection mode.

22. A telephone comprising:
(a) a first table for storing a first dial number;
(b) a second table for storing a second dial number;
(c) a switch for selecting one of a general line mode and a private branch exchange mode;
(d) a line interfacing unit for connecting the telephone to a communication line;
(e) a key inputting unit having an operation key;
(f) a DTMF signal generator for generating a DTMF signal; and
(g) a controller for controlling said telephone in accordance with said switch;
wherein in said general line mode, said controller changes operation mode to said general line mode, said first dial number read out from said first dial table upon pushing said key is sent to said DTMF signal generator, and said DTMF signal is sent via said line interfacing unit, and
wherein in said private branch exchange mode, said controller changes operation mode to said private branch exchange mode, said second dial number read out from said second dial table upon pushing said key is sent to said DTMF signal generator, and said DTMF signal is sent to said private branch exchange via said line interfacing unit.

23. A telephone according to claim 1, wherein once said switch is transitioned to select one of the first mode of operation and the second mode of operation, the switch remains in the selected mode of operation until the switch is transitioned to the other mode of operation.

24. A telephone according to claim 1, wherein the second text data comprises predefined data which is permanently stored in said second table.

* * * * *